United States Patent [19]

Harman et al.

[11] Patent Number: 4,635,456
[45] Date of Patent: Jan. 13, 1987

[54] DEVICE FOR SHOT-PEENING INSIDE SURFACE OF U-BEND REGION OF HEAT EXCHANGER TUBING

[75] Inventors: Douglas G. Harman, Pensacola Beach; Elbert P. Odor, Tampa, both of Fla.

[73] Assignee: Westinghouse Electric Corp., Pittsburgh, Pa.

[21] Appl. No.: 613,674

[22] Filed: May 24, 1984

[51] Int. Cl.[4] .......................................... C05B 17/00
[52] U.S. Cl. ........................................ 72/53; 29/727; 72/370; 74/660
[58] Field of Search ................... 72/53, 370; 29/723, 29/727; 74/660

[56] References Cited

U.S. PATENT DOCUMENTS

| | | | |
|---|---|---|---|
| 1,905,114 | 4/1933 | Lauterbur et al. | 72/660 |
| 2,971,556 | 2/1961 | Armstrong et al. | 72/370 |
| 3,648,498 | 3/1972 | Voss et al. | 72/53 |
| 3,903,974 | 9/1975 | Cullen | 72/370 |
| 4,481,802 | 11/1984 | Harman et al. | 72/53 |

Primary Examiner—Francis S. Husar
Assistant Examiner—Robert Showalter
Attorney, Agent, or Firm—Daniel C. Abeles

[57] ABSTRACT

Apparatus (10) for imparting protecting compressive stresses to the inside surfaces of a U-shaped heat exchanger tube (12) in order to eliminate or substantially reduce residual tensile stresses within the U-bend region of the U-shaped heat exchanger tube (12) as a result of the fabrication of the U-shaped tube (12) under cold bending techniques comprises a high-speed rotary drive motor (22), flexible drive shafts (28, 30) extending throughout the axial length of the U-bend region of the U-shaped tube (12), and shot-peening flaps (32) having tungsten-carbide shot particles secured thereto. A plurality of epicyclic gear trains (26) are axially spaced along the flexible drive shafts (28, 30) so as to cause the shot-peening flaps (32) to orbit about the interior surface of the U-bend region of the U-shaped tube (12) simultaneously with the high-speed rotary drive of the flexible drive shafts (28, 30).

16 Claims, 5 Drawing Figures

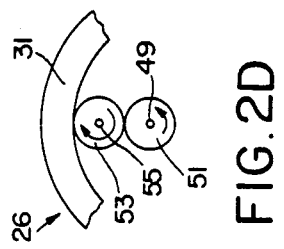
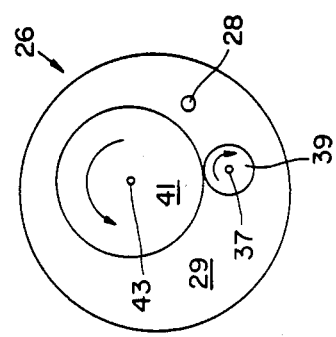
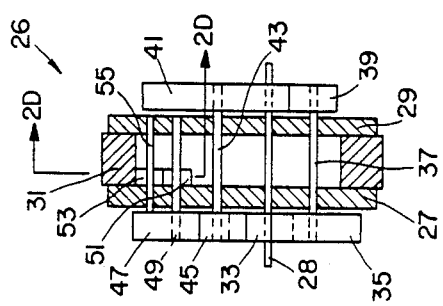
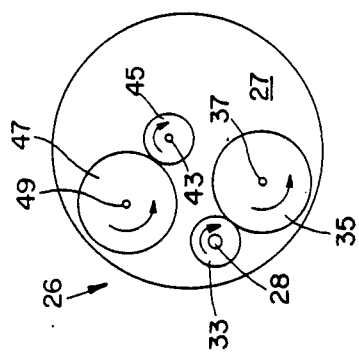

DEVICE FOR SHOT-PEENING INSIDE SURFACE OF U-BEND REGION OF HEAT EXCHANGER TUBING

BACKGROUND OF THE INVENTION

1. Field of the Invention

The present invention relates generally to heat exchangers, and more particularly to a new and improved device for shot-peening the inside surface of the U-bend region of oval-shaped heat exchanger tubes employed, for example, within a steam generator heat exchanger of a pressurized water nuclear reactor (PWR) facility so as to impart to the inside surface material of each heat exchanger tube U-bend region compressive stresses for counteracting residual tensile stresses developed within the U-bend regions of each heat exchanger tube as a result of the cold-bending fabrication processing of the heat exchanger tubes, whereby stress corrosion cracking failures of the tubes are effectively eliminated or at least substantially reduced.

2. Description of the Prior Art

A nuclear reactor produces heat as a result of the fission of nuclear material which is disposed within fuel rods, the fuel rods being secured together so as to define fuel assemblies. The fuel assemblies define the nuclear reactor core, and the cores is disposed within a reactor or pressure vessel. In commerical nuclear reactor facilities, the heat produced by means of the fission processes is utilized to generate electricity. In particular, conventional facilities usually comprise one or more primary core coolant flow loops and heat transfer or exchange loops, and may also comprise a corresponding number of secondary flow and heat transfer or exchange loops to which conventional steam generators and steam turbines, as well as electrical generators, are fluidically and mechanically connected, respectively. a typical energy conversion process for such commercial nuclear reactor facilities would therefore comprise the transfer of heat from the nuclear reactor core to the primary coolant flow and loop system, from the primary coolant flow and loop system to the secondary coolant flow and loop system by means of suitable heat exchangers, and finally from the secondary coolant flow and loop system to the steam generators by means of further suitable heat exchangers. The generated steam is then of course transmitted ot the steam turbines to which the electrical generators are operatively connected, and from which the electricity is ultimately generated.

In a pressurized water reactor (PWR), water serves as the reactor core coolant, and there is no provision of a secondary coolant flow and loop system as is required in connection with a liquid metal-cooled fast breeder reactor (LMFBR) wherein the secondary coolant flow and loop system, in which there is disposed a liquid metal, such as, for example, sodium, as in the case of liquid sodium also being disposed within the primary coolant flow and loop system, serves as a buffer zone between the primary core liquid metal coolant flow and loop system and the water-steam generator system. In a pressurzied water reactor, therefore, the water is circulated only through the primary coolant flow and loop system which may typically comprise the nuclear reactor core, a heat exchanger, and a circulating pump. Some nuclear reactors may have more than one primary coolant flow loop within the primary coolant flow and loop system, and in this instance, the nuclear reactor core and the reactor pressure vessel, within which the core is disposed, are connected in common to each of the primary coolant flow loops. The heat generated by means of the nuclear core is thus removed therefrom by means of the reactor core coolant which is conducted into the reactor pressure vessel and through the reactor core. The heated reactor core coolant then exits from the nuclear reactor core and the reactor pressure vessel so as to flow through the heat exchangers which serve to transfer the heat from the heated nuclear reactor core coolant water to the water being conducted through the heat exchangers whereby steam is generated for use within the steam turbines. The steam turbines are then of course utilized to drive the electrical generators for generating electrictiy. the cooled reactor core water coolant disposed within the primary flow and loop system is then recirculated back to the ractor pressure vessel and the nuclear reactor core by means of the primary flow loop system circulating pump, and the coolant cycle is repeated.

Within one type of conventional, exemplary heat exchanger system defined between the primary nuclear reactor core water coolant flow and loop system and the water-steam generator flow path through which water is conducted for the generation of steam, the heat exchanger vessel has a lower portion thereof divided into two separate and isolated sections for the introduction and withdrawal, respectively, of hot nuclear reactor core coolant water. The two lower sections, in effect, define headers into which the core coolant water is introduced and from which the coolant water is withdrawn, and the upper boundary of the headers is defined by means of a horizontally disposed tubesheet to which the ends of numerous reactor core coolant water conduction tubes or conduits are fixedly secured. In particular, the reactor core coolant water conduction tubes or conduits have oval-shaped configurations with the tubes only defining one-half of a closed oval path. The open ends of the tubes are thus secured within the tubesheet such that the tubes themselves extend vertically upwardly from the tubesheet, and consequently, one end of each tube is fluidically connected to the reactor core coolant water inlet header for the reception of the reactor core coolant water, while the other end of each tube is fluidically connected to the reactor core coolant water outlet header for the discharge of the cooled reactor core coolant water to be recirculated back to the reactor core. Water, from which steam is to be generated, is introduced into the heat exchanger at a level which is above the tubesheet, and generated steam is discharged from the heat exchanger from the uppermost portion thereof as a result of the heat exchange process occurring within the heat exchanger.

The nuclear reactor core coolant water conduction tubes or conduits are fabricated from a suitable metal alloy material, such as, for example, INCONEL 600, in view of the fact that such material exhibits desirable operational characteristics which are critically requisite for service within heat exchanger systems. For example, such material exhibits good heat transfer properties, corrosion resistance, and good structural integrity under high-temperature conditions. In addition, such material is readily formable and weldable, and, of course, is commercially available. As noted hereinabove, the water conduction tubes have a substantially inverted U-shaped configuration, and the tubes are fabricated by means of well-known cold bending techniques. Unfortunately, as a result of such fabrication techniques, residual tensile stresses are developed within the U-shaped tubes or conduits, particularly upon the inside surfaces thereof at the relatively sharp bend locations. Such stresses have been shown to cause stress corrosion cracking failures within the heat exchangers which have conventionally necessitated the plugging or closing of the ends of the cracked or failed coolant water conduction tubes so as to effectively remove such failed or cracked coolant water conduction tubes from the heat exchange service. Subsequently, of course, such failed or cracked conduction tubes will have to be repaired or replaced, and therefore, it can readily be appreciated that such prematurely terminated service lives of the core coolant water conduction tubes result in substantially enhanced operating costs for the power plant facilities in view of increased costs for replacement per se of the cracked or failed conduction tubes, maintenance personnel time for accomplishing the repair or replacement of the failed or cracked core coolant water conduction tubes, and lost revenues to the powerplant facility as a result of those time periods during which electrically generated power production is terminated, curtailed, or reduced while the necessary repairs or replacement operations for such failed or cracked core coolant water conduction tubes within the particular heat exchanger system are being performed.

It has been determined, and confirmed by microhardness measurements and stress corrosion cracking tests, that if compressive surface stresses, which would effectively counteract the aforenoted deleterious effects of the residual tensile stresses, could be provided upon the interior surfaces of the reactor core coolant water conduction tubes within the U-bend regions thereof, then the stress corrosion cracking failures exhibited within the conduction tubes can be eliminated or substantially reduced.

Accordingly, it is an object of the present invention to provide new and improved apparatus for imparting compressive stresses to the inside surfaces of substantially U-shaped heat exchanger tubes within the U-bend regions thereof.

Another object of the present invention is to provide new and improved apparatus for imparting compressive stresses to the inside surfaces of substantially U-shaped heat exchanger tubes within the U-bend regions thereof so as to effectively overcome the deleterious effects of the residual tensile stresses developed within the U-bend regions of conventional U-shaped heat exchanger tubes.

Yet another object of the present invention is to provide new and improved apparatus for imparting compressive stresses to the inside surfaces of substantially U-shaped heat exchanger tubes within the U-bend regions thereof so as to overcome the various operational disadvantages or drawbacks characteristic of conventional U-shaped heat exchanger tubes as noted hereinabove.

Still another object of the present invention is to provide new and improved apparatus for imparting compressive stresses to the inside surfaces of substantially U-shaped heat exchanger tubes within the U-bend regions thereof wherein the heat exchanger tubes are employed within nuclear reactor heat exchange systems.

Yet still another object of the present invention is to provide new and improved apparatus for imparting compressive stresses to the inside surfaces of substantially U-shaped heat exchanger tubes within the U-bend regions thereof so as to counteract the residual tensile stresses developed within the U-bend regions of the U-shaped heat exchanger tubes as a result of the cold bending fabrication thereof.

Still yet another object of the present invention is to provide new and improved apparatus for imparting compressive stresses to the inside surfaces of substantially U-shaped heat exchanger tubes within the U-bend regions thereof so as to prevent stress corrosion cracking of the U-shaped heat exchanger tubes.

A further object of the present invention is to provide new and improved apparatus for imparting compressive stresses to the inside surfaces of substantially U-shaped heat exchanger tubes within the U-bend regions thereof so as to prevent stress corrosion cracking failures within the U-shaped heat exchanger tubes whereby the service lives thereof are substantially increased.

A yet further object of the present invention is to provide new and improved apparatus for imparting compressive stresses to the inside surfaces of substantially U-shaped heat exchanger tubes within the U-bend regions thereof so as to substantially eliminate or reduce stress corrosion cracking of the U-shaped heat exchanger tubes within the U-bend regions thereof as a result of residual tensile stresses originally developed within the U-bend regions of the U-shaped heat exchanger tubes as a result of the cold bending fabrications techniques employed in connection therewith.

A still further object of the present invention is to provide new and improved apparatus for imparting compressive stresses to the inside surfaces of substantially U-shaped heat exchanger tubes within the U-bend regions thereof so as to substantially eleminate or reduce stress corrosion cracking failures of the U-shaped heat exchanger tubes within the U-bend regions thereof and thereby effectively reduce maintenance and repair costs in connection with the heat exchanger system.

SUMMARY OF THE INVENTION

The foregoing and other objectives are achieved in accordance with the present invention through the provision of new and improved apparatus for imparting compressive stresses to the inside surfaces of substantially U-shaped heat exchanger tubes within the U-bend regions thereof in order to counteract the deleterious effects of residual tensile stresses developed within the U-bend regions of the U-shaped heat exchanger tubes as a result of the cold bending fabrication processing thereof. Such residual tensile stresses have lead to stress corrosion cracking failures within the heat exchanger tubes necessitating their effective removal from operational service until the same could be repaired or replaced.

In accordance with the present invention, apparatus is provided for effectively treating the inside surfaces of the U-shaped heat exchanger tubes, particularly the U-bend regions thereof, by imparting compressive stresses to such surfaces. The heat echanger tubes are utilized, for example, within nuclear reactor heat exchange systems, and as a result of the impression upon the interior U-bend surfaces of the U-shaped heat exchanger tubes by means of the present invention apparatus, stress corrosion cracking failures within the heat exchanger tubes have been substantially eliminated or reduced. In particular, the apparatus of the present invention comprises shot-peening apparatus for imparting the compressive stresses to the inside surfaces of the U-shaped heat exchanger tube U-bend regions. A plurality of ROTO-PEEN flaps, which are commercially available from the 3M COMPANY, are secured in a serial array to serially arranged flexible drive shafts operatively connected to a series of epicyclic gear trains. The entire arrangement or system of the epicyclic gear trains, the flexible drive shafts interposed between successive epicyclic gear trains, and the ROTO-PEEN flaps is disposed throughout substantially the entire U-bend region of each U-shaped heat exchanger tube in a longitudinally or axially extending mode with respect thereto so as to simultaneously impart the compressive stresses to the interior surfaces of the U-shaped heat exchanger tubes throughout the entire length thereof.

The ROTO-PEEN flaps comprise spherically-shaped tungsten carbide shot particles or balls permanently secured to material flaps fabricated from suitable phenolic resins. The flaps are cemented to the flexible drive shafts of the epicyclic gear trains, and the flexible drive shafts of the epicyclic gear trains are eccentrically mounted within the gear trains so as to properly dispose the flaps at a predetermined distance relative to the inside or interior surfaces of the heat exchanger tubes such that the flaps will properly impinge upon the tube surfaces so as to impress the compressive stresses thereon. As a result of the employment of the epicyclic gear trains, the flexible drive shafts, and the ROTO-PEEN flaps secured thereon, are rapidly rotated about the axes of the flexible drive shafts, and in addition, are also rotated slowly about the entire interior periphery of the heat exchanger tube in an orbital mode whereby all interior surfaces of each heat exchanger tube are uniformly treated. Further uniformity of treatment is also assured by imparting motion to the entire system along the axial or longitudinal extent thereof in a substantially rectilinearly reciprocating manner. the provisions of the flexible drive shafts, upon which the RORO-PEEN flaps are fixedly secured, insure the capability of the apparatus system of the present invention to follow the particular curvature of the U-bend region of each U-shaped heat exchanger tube.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, wherein:

FIGS. 2A, 2B, 2C, and 2D are, respectively, left side elevation, vertical cross-section, right side elevation ,and partial cross-section views of an exemplary epicyclic gear train which may be utilized within the apparatus of FIG. 1.

DESCRIPTION OF THE PREFERRED EMBODIMENT

Figure 1:
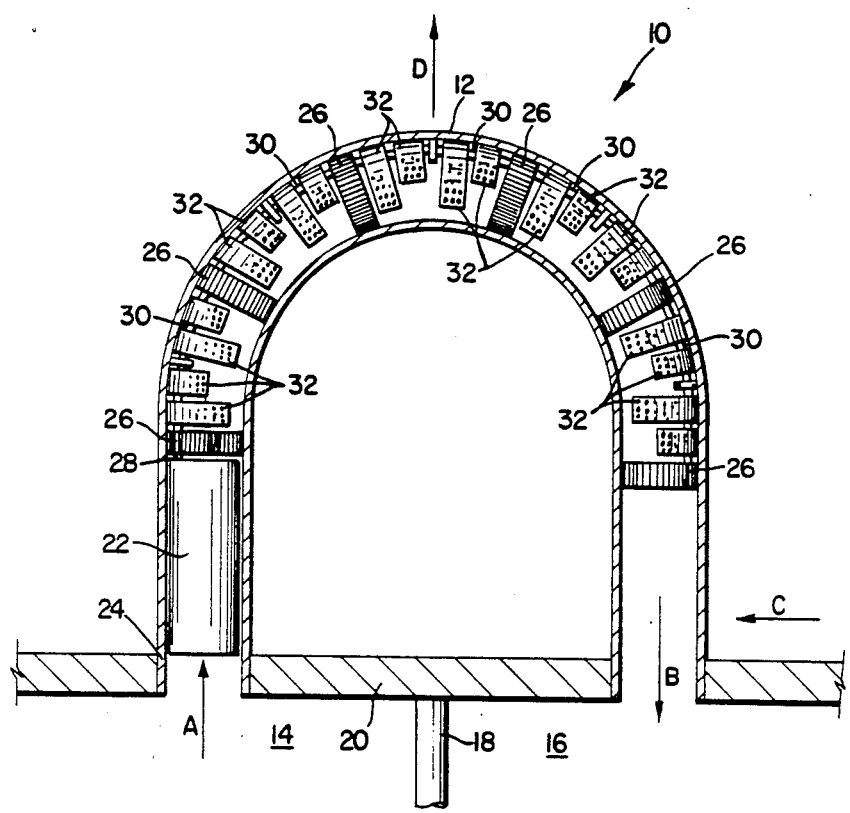
FIG. 1 is a schematic view of a U-shaped heat exchanger tube, such as may be utilized within a nuclear reactor heat exchange system, wherein the new and improved apparatus of the present invention, showing the cooperative parts thereof, is disposed interiorly of the U-shaped heat exchanger tube so as to impart compressive stresses to the interior surfaces thereof, particularly within the U-bend regions thereof, so as to counteract the deleterious effects of residual tensile stresses normally exhibited within U-shaped heat exchanger tubes as a result of the cold bending fabrication processing thereof.

Referring now to the drawing, there is shown in the SOLE FIGURE the new and improved apparatus of the present invention, generally indicated by the reference character 10, for shot-peening the interior surfaces of substantially U-shaped heat exchange tubes 12 in order to impart thereto compressive stresses for counteracting residual tensile stresses developed within the U-bend regions of the U-shaped heat exchanger tubes 12 as a result of the cold-bending fabrication processing of the U-sahped heat exchanger tubes 12, wherein such residual tensile stresses have caused stress corrosion cracking failures within conventionally fabricated U-shaped heat exchanger tubes. The U-shaped heat exchange tubes 12 may be utilized in connection with any type of heat exchange system, however, in connection with the particular disclosure of the present invention, the heat exchange tubes 12 are employed, for example, within a nuclear reactor steam generator heat exchange system wherein nuclear reactor core coolant water is introduced into an inlet header 14 to which one end of each heat exchange tube 12 is fluidically connected. The core coolant water then flows into and upwardly through the heat exchange tube 12 as indicated by the arrow A, and after traversing the heat exchange tube 12, the relatively cooled core coolant water exits from the heat exchange tube 12, as denoted by means of arrow B, into an outlet header 16 from which the core coolant water is recirculated back to the nuclear reactor core, not shown. The inlet and outlet headers 14 and 16, respectively, are fluidically separated by means of a suitable baffle 18, and the ends of each heat exchanger tube 12 are fixedly secured within a horizontally disposed tubesheet 20. Relatively cool water, from which steam is to be generated by means of the heat exchange process, is introduced into the heat exchange at some level above tubesheet 20 and as denoted by arrow C, and after undergoing the heat exchange process with the hot reactor core coolant water flowing through the U-shaped heat exchanger tubes 12, generated steam is discharged from the uppermost region of the heat exchanger as denoted by the arrow D.

As noted hereinabove, in order to impart to the U-shaped heat exchange tubes 12 the necessarily beneficial compressive stresses upon the interior surfaces thereof so as to effectively counteract the deleterious residual tensile stresses developed or generated within the U-bend regions of the U-shaped heat exchange tubes 12 as a result of the cold bending fabrication processing thereof, the apparatus 10 of the present invention is seen to comprise a suitable, high-speed rotary drive motor 22 which is supported, by suitable means not shown, within, for example, the inlet end 24 of the U-shaped heat exchange tube 12. It is of course to be appreciated that the apparatus 10 of the present invention is to be utilized in connection with the heat exchange tubes 12 preferably before use of the heat exchange tubes 12 within a heat exchange process to be conducted within the nuclear reactor steam generator heat exchange system so as to beneficially impart to the heat exchange tubes 12 the necessary compressive stresses whereby the deleterious effects of the residual tensile stresses connot manifest themselves through means of the development of stress corrosion cracking failures during operation of the heat exchanger system and the heat exchange tubes 12. In other words, for newly installed heat exchange tubes 12, the apparatus 10 of the present invention should be employed immediately after installation of the tubes 12 within the steam generator heat exchanger so as to effectively eliminate the residual tensile stresses present within the tubes. In a similar manner, in connection with heat exchange tubes 12 already present within an operative heat exchanger system, compressive stress treatment of such tubes 12 by means of the apparatus 10 of the present invention should be achieved at the earliest possible time, such as, for example, during a shut-down period in order to impart thereto the beneficial compressive stresses whereby the service lives of the heat exchanger tubes 12 will be enhanced as much as possible.

The high-speed rotary drive motor 22 is adapted to be remotely controlled, actuated, and moved within the heat exchange tube 12 in a co-axial manner, and a plurality of axially spaced epicyclic gear trains 26 are disposed internally within the heat exchange tube 12 so as to also be co-axially disposed therewithin. The outside diametrical extent of the gear train housings is substantially the same as the inside diameter of the heat exchange tubes 12 such that the gear train housings are disposed in a substantially snug-fit manner within the heat exchange tubes 12. As a result, as will become more apparent hereinafter, proper circumferential orientation of the gear trains 26 relative to the heat exchange tubes 12 is defined which, in turn, leads to the proper beneficial compressive stress treatment of the inside surfaces of the heat exchange tubes 12. The high-speed rotary drive motor 22 is seen to be mechanically connected to a first one of the epicyclic gear trains 26 by means of a flexible drive shaft 28, and in this manner, the output drive of the motor 22 is connected to the input drive of the first epicyclic gear train 26. In a similar manner, the output drive of each succeeding epicyclic gear train 26 is connected to the input drive of the next epicyclic gear train 26 by means of additional flexible drive shafts 30, all of the flexible drive shafts 28 and 30 serving, in effect, as flexible mounting means upon which the epicyclic gear trains 26 are disposed so that such gear trains 26, and the entire system, can easily follow the particular curvature of the U-shaped heat exchanger tubes 12.

Between the axially spaced, serially arranged epicyclic gear trains 26, there is provided a multitude of ROTO-PEEN flaps 32 which are fixedly secured to the flexible drive shafts 30, such as, for example, by being cemented directly thereto. The ROTO-PEEN flaps are commercially available from the 3M COMPANY, and comprise material flaps fabricated from suitable phenolic resins to which numerous tungsten carbide shot particles or balls are permanently secured. As is characteristic of the epicyclic gear trains 26, as a result of the high-speed rotary operation of the motor 22, all of the flexible drive shafts 28 and 30 will likewise be rotated at a relatively high rate of speed, and in addition, the entire gear train assembly 26, including the drive shafts 30 thereof, will slowly orbit about the central axes of the gear trains 26 and the drive motor 22. It is noted that the drive shafts 30 are all eccentrically mounted with respect to their associated gear trains 26 such that the drive shafts 30 always define a small stand-off distance with respect to the interior surface of the heat exchanger tube 12. This distance is a critical parameter and is predetermined to have a value of 0.040–0.050 inches. In this manner, as the high speed drive shafts 30 rotate, the ROTO-PEEN flaps 32 are effectively caused to be forced between the rotating shafts 30 and the interior surfaces of the heat exchanger tubes 12, and upon emerging from such confined spaces, the flaps 32 forcefully exhibit a snapping action by means of which the shot-peening effects upon the interior surfaces of the heat exchange tubes 12 are achieved. As a result of such shot-peening effects being impressed upon the interior surfaces of the heat exchanger tubes 12, compressive stresses are developed within the interior surfaces of the heat exchanger tubes 12 so as to effectively counteract any residual tensile stresses which may be present within the U-bend regions of the tubes 12 as a result of the cold-bending fabrication processing thereof.

Epicyclic gear trains are of course well known in the art, and an exemplary type of epicyclic gear train 26 which may be employed within the apparatus system of FIG. 1 is disclosed within FIGS. 2A–2D. In particular, the gear train unit 26 is seen to comprise a pair of laterally spaced face plates 27 and 29 which are disposed upon opposite sides of a ring gear 31. The diametrical extent of the ring gear 31 is substantially the same as that of the inside surface of the U-shaped tube 12, and the exterior surface of the ring gear 31 may be provided with some frictional material so as to render the same rotationally stationary when disposed within the U-shaped tube 12. The face plates 27 and 29 may also be mounted or secured with respect to the ring gear 31, in a suitable manner by means, not shown, such as, for example, by pins and grooves, stepped bosses or flanges, or the like, such that relative radial movement between the face plates 27 and 29, and the ring gear 31, is prevented while nevertheless permitting rotational movement of the face plates 27 and 29, about an axis perpendicular to the face plates, relative to the ring gear 31.

The high-speed drive shaft 28 is mounted within both face plates 27 and 29 so as to extend therethrough, the drive shaft being capable of spinning, for example at 4000 RPM. A first gear 33 is fixedly mounted upon the shaft 28, and assuming a clockwise rotation of the shaft 28 as viewed from an elevational standpoint of FIG. 2A, gear 33 will likewise rotate in a clockwise mode as so indicated. Gear 33 may have, for example, six gear teeth and is adapted to be enmeshed with a second gear 35 which has, for example, twelve teeth, second gear 35 being mounted upon face plates 27 and 29 by means of a shaft 37 which is mounted within and passes through both of face plates 27 and 29. A third gear 39 is fixedly secured upon the opposite end of shaft 37 so as to be disposed exteriorly of the face plate 29, and gear 39 has, for example, six teeth. Gear 39 is, in turn, enmeshed with a fourth gear 41 which is provided with eighteen teeth, and in view of the fact that gear 39 rotates in a clockwise direction as viewed from the vantage point of a front elevation view of face plate 29, as seen in FIG. 2C, gear 41 will rotate in a counter-clockwise mode. Fourth gear 41 is mounted upon face plates 27 and 29 by means of a second gear shaft 43 which is mounted within and passes through both of face plates 27 and 29 and a fifth gear 45 is fixedly secured to the opposite end of shaft 43 so as to be disposed exteriorly of face plate 27 within the same planes as gears 33 and 35. Fifth gear 45 is provided with six teeth and is enmeshed with a sixth gear 47 which has twelve teeth provided thereon. Sixth gear 47 is mounted upon face plates 27 and 29 by means of a third gear shaft 49, and a seventh gear 51 is fixedly mounted upon shaft 49 so as to be disposed internally of the gear unit 26 between face plates 27 and 29. Seventh gear 51 is provided with six teeth and is engaged with an eight gear 53 which is also provided with six teeth, gear 53 being mounted upon a fourth gear shaft 55 mounted within face plates 27 and 29. Eighth gear 53 is also enmeshed with the ring gear 31, and therefore, as a result of the high-speed rotation of the power drive shaft 28 and first gear 33 mounted thereon, the eighth gear 53 will orbit around the interior surface of ring gear 31 at an approximate rate of 75 RPM as a result of the variously noted gear reductions, including the fact that ring gear 31 is provided with twenty-six teeth.

The axial extent or length of the apparatus of the present invention is of course predetermined such that the apparatus 10 extends throughout the U-bend region of the U-shaped heat exchanger tubes 12 whereby the compressive stress treatment of the interior surfaces of the heat exchanger tubes 12 can be simultaneously performed upon all axially spaced areas of the tubes 12. Uniformity of the compressive stress treatment is of course ultimately achieved as a result of the orbital movement of the gear train system drive shafts 30 and the ROTO-PEEN flaps 32 fixed secured thereto, and in addition, further uniformity of treatment is assured by altering the axial disposition of the motor drive 22 which, of course, in turn, alters the axial disposition of the individual gear trains units 26 and the ROTO-PEEN flaps 32 operatively associated therewith. Such axial movement of the motor drive 22 can be accomplished in a continuous reciprocating manner, a predeterminedly timed forward or backward stepped mode, or the like.

Thus, it may be seen that the apparatus of the present invention enables protective compressive surface stresses to be imparted to, or impressed upon, the interior surfaces of heat exchanger tubes having a substantially U-shaped configuration so as to effectively counteract the deleterious effects of residual tensile stresses developed within the tubes as a result of the cold-bending fabrication processing of the tubes. The apparatus uniformly peens the interior surfaces of the tubes within the U-bend regions thereof, and predeterminedly correct or proper peening intensity, saturation, and coverage of all areas of the interior surfaces of the tubes is achieved through means of the epicyclic gear train drive system of the present invention wherein slow orbiting of the peening components is derived in addition to the high-speed rotation of the same with respect to particular arcuate sections of the tube walls, and still further, the axial disposition of the entire system may be altered. The stand-off distance defined between the peening components and the interior wall surfaces, as well as the particular time period during which the peening components apply the compressive stresses to the particular areas of the tube surfaces, additionally serve to achieve the uniform compressive stress treatment of the heat exchange tube surfaces. Such compressive surface stress results have in fact been confirmed by means of microhardness measurements and stress corrosion cracking tests whereby it has been verified that subsequent to the treatment of the heat exchange tubes by means of the present invention apparatus, residual tensile stresses have been eliminated or substantially reduced within the U-bend regions of the U-shaped heat exchanger tubes.

Obviously, many modifications and variations of the present invention are possible in light of the above teachings. It is therefore to be understood that within the scope of the appended claims, the present invention may be practiced otherwise than as specifically described herein.

We claim:

1. Apparatus for uniformly imparting compressive stresses to the interior surface portions of a U-bend region of a U-shaped tube so as to counteract any residual tensile stresses developed within said U-shaped tube during the formation of said U-bend region thereof, comprising:

a single high-speed rotary drive motor;

a plurality of serially arranged flexible drive shafts extending substantially throughout the axial length of said U-bend region of said U-shaped tube with one end of a first one of said plurality of serially arranged flexible drive shafts being operatively connected to said single high-speed rotary drive motor;

shot-peening means secured upon most all of said plurality of serially arranged flexible drive shafts for impacting upon said interior surface portions of said U-bend region of said U-shaped tube; and a plurality of epicyclic gear trains interposed between and operatively connected to said plurality of serially arranged flexible drive shafts for simultaneously causing said plurality of serially arranged flexible drive shafts, and said shot-peening means secured thereon, to slowly orbit about the interior of said U-bend region of said U-shaped tube while said plurality of serially arranged flexible drive shafts rotate in a high-speed mode about the axes of said plurality of serially arranged flexible drive shafts so as to uniformly impart said compressive stresses to said interior surface portions of said U-bend region of said U-shaped tube.

2. Aparatus as set forth in claim 1, wherein:

the outside diametrical extent of each one of said plurality of epicyclic gear trains is substantially the same as the inside diametrical extent of said U-shaped bend region of said U-shaped tube so as to support said plurality of serially arranged flexible drive shafts, and said shot-peening means secured thereon, relative to said interior surface portions of said U-bend region of said U-shaped tube.

3. Apparatus as set forth in claim 1, wherein: shot-peening means comprises:

a plurality of flaps fixedly secured upon most all of said plurality of serially arranged flexible drive shafts, and tungsten-carbide shot particles fixedly secured upon said plurality of flaps.

4. Apparatus as set forth in claim 1, wherein:

said plurality of serially arranged flexible drive shafts are connected eccentrically to each of said epicyclic gear trains.

5. Apparatus as set forth in claim 1, wherein:

the output drive of said drive motor defines the input drive to a first one of said epicyclic gear trains through said first one of said serially arranged flexible drive shafts; and the output drive of each epicyclic gear train, with the exception of the last one of said plurality of epicyclic gear trains, defines the input drive to the succeeding epicyclic gear train through the remaining ones of said plurality of serially arranged flexible drive shafts.

6. Apparatus as set forth in claim 1, wherein:

said plurality of serially arranged flexible drive shafts are disposed in predetermined distance away from the interior surface of said U-bend region of said U-shaped tube such that said shot-peening means can properly impact upon said interior surface of said U-bend region of said U-shaped tube.

7. Apparatus for uniformly imparting compressive stresses to the interior surface portions of a U-bend region of a U-shaped tube so as to counteract any residual tensile stresses developed within said U-shaped tube during the formation of said U-bend region thereof, comprising:
   a single high-speed rotary drive motor;
   a plurality of serially arranged flexible drive shafts extending substantially throughout the axial length of said U-bend region of said U-shaped tube with one end of a first one of said plurality of serially arranged flexible drive shafts being operatively connected to said single high-speed rotary drive motor;
   shot-peening means secured upon most all of said plurality of serially arranged flexible drive shafts for impacting upon said interior surface portions of said U-bend region of said U-shaped tube; and
   a plurality of serially arranged epicyclic gear trains interposed between, and operatively connected to, alternate ones of said plurality of serially arranged flexible drive shafts, for simultaneously causing said plurality of serially arranged flexible drive shafts, and said shot-peening means secured thereon, to slowly orbit about the interior of said U-bend region of said U-shaped tube while said plurality of serially arranged flexible drive shafts rotate in a high-speed mode about the axes of said plurality of serially arranged flexible drive shafts so as to uniformly impart said compressive stresses to said interior surface portions of said U-bend region of said U-shaped tube.

8. Apparatus as set forth in claim 7, wherein said shot-peening means comprises:
   a plurality of flaps fixedly secured upon most all of said plurality of serially arrange flexible drive shafts; and
   tungsten-carbide shot particles fixedly secured upon said plurality of flaps.

9. Apparatus as set forth in claim 7, wherein:
   said plurality of serially arranged flexible drive shafts are connected eccentrically to each one of said epicyclic gear trains.

10. Apparatus as set forth in claim 7, wherein:
   the output drive of said drive motor defines the input drive to a first one of said plurality of epicyclic gear trains through the first one of said serially arranged flexible drive shafts; and
   the output drive of each epicyclic gear train, with the exception of the last one of said plurality of epicyclic gear trains, defines the input drive to the succeeding epicyclic gear train through the remaining ones of said plurality of serially arranged flexible drive shafts.

11. Apparatus as set forth in claim 7, further comprising:
   means for maintaining said plurality of serially arranged flexible drive shafts a predetermined distance away from the interior surface of said U-bend region of said U-shaped tube such that said shot-peening means can properly impact upon said interior surface of said U-bend region of said U-shaped tube.

12. Apparatus as set forth in claim 11, wherein:
   said maintaining means comprises the outside diametrical extent of each one of said plurality of epicyclic gear trains being substantially the same as the inside diametrical extent of said U-shaped bend region of said U-shaped tube so as to support said plurality of serially arranged flexible drive shafts, and said shot-peening means secured thereon, relative to said interior surface portions of said U-bend region of said U-shaped tube with said preetermined distance defined therebetween.

13. Apparatus as set forth in claim 11, wherein:
   said shot-peening means are secured upon said plurality of drive shafts in an eccentric manner.

14. Apparatus for uniformly imparting compressive stresses to the interior surface portions of a U-bend region of a U-shaped tube so as to counteract any residual tensile stresses developed within said U-shaped tube during the formation of said U-bend region thereof, comprising:
   a single high-speed rotary drive motor;
   a plurality of serially arranged flexible drive shafts extending substantially throughout the axial length of said U-bend region of said U-shaped tube with one end of a first one of said plurality of serially arranged flexible drive shafts being operatively connected to said single high-speed rotary drive motor;
   shot-peening means secured upon most all of said plurality of serially arranged flexible drive shafts for impacting upon said interior surface portions of said U-bend region of said U-shaped tube; and
   a plurality of serially arranged epicyclic gear trains interposed between, and opeatively connected to, alternate ones of said plurality of serially arranged flexible drive shafts, for simultaneously causing said plurality of serially arranged flexible drive shafts, and said shot-peening means secured thereon, to slowly orbit about the interior of said U-bend region of said U-shaped tube while said plurality of serially arranged flexible drive shafts rotate in a high-speed mode about the axes of said plurality of serially arranged flexible drive shafts so as to uniformly impart said compressive stresses to said interior surface portions of said U-bend region of said U-shaped tube, the outer diametrical extent of each one of said plurality of epicyclic gear trains being substantially the same as the inside diametrical extent of said U-bend region of said U-shaped tube so as to define peripheral contact with said interior surface of said U-bend region of said U-shaped tube for maintaining said plurality of serially arranged flexible drive shafts a predetermined distance away from said interior surface of said U-bend region of said U-shaped tube such that said shot-peening means can properly impact upon said interior surface of said U-bend region of said U-shaped tube for imparting said compressive stresses thereto.

15. Apparatus as set forth in claim 14, wherein said shot-peening means comprises:
   a plurality of flaps fixedly secured upon most all of said plurality of serially arranged flexible drive shafts; and
   tungsten-carbide shot particles fixedly secured upon said plurality of flaps.

16. Apparatus as set forth in claim 15, wherein:
   said shot-peening flaps are secured upon said plurality of drive shafts in an eccentric manner.

* * * * *